United States Patent [19]

Dischert et al.

[11] Patent Number: 4,731,656
[45] Date of Patent: Mar. 15, 1988

[54] SOLID STATE IMAGER WITH TRANSFER SMEAR SUPPRESSION FOR MOVING AND STATIONARY IMAGES

[75] Inventors: Robert A. Dischert, Burlington Township, Burlington County; Allen L. Limberg, Hopewell Township, Mercer County, both of N.J.

[73] Assignee: RCA Corporation, Princeton, N.J.

[21] Appl. No.: 880,321

[22] Filed: Jun. 30, 1986

[51] Int. Cl.$^4$ .............................................. H04N 3/14
[52] U.S. Cl. ............................ 358/213.25; 358/213.26
[58] Field of Search ...................... 358/213.23, 213.24, 358/213.25, 213.26, 221

[56] References Cited

U.S. PATENT DOCUMENTS

| | | | |
|---|---|---|---|
| 3,777,061 | 12/1973 | Takemura | 358/213.25 |
| 4,010,319 | 3/1977 | Levine | 358/213 |
| 4,032,976 | 6/1977 | Levine | 358/213 |
| 4,127,877 | 11/1978 | Morishita et al. | 358/213.26 |
| 4,178,614 | 12/1979 | Sauer | 358/213 |
| 4,490,744 | 12/1984 | Levine | 358/213 |
| 4,496,982 | 1/1985 | Levine | 358/221 |
| 4,498,105 | 2/1985 | Crawshaw | 358/213 |
| 4,539,596 | 9/1985 | Elabd | 358/213.24 |
| 4,567,524 | 1/1986 | Levine | 358/213 |
| 4,584,609 | 4/1986 | Klein et al. | 358/213.26 |

OTHER PUBLICATIONS

A. J. P. Theuwissen et al., "The Accordian Imager . . . ", published in *Electronic Imaging* 85, Oct. 1985, pp. 87–90.

Primary Examiner—Gene Z. Rubinson
Assistant Examiner—Stephen Brinich
Attorney, Agent, or Firm—Paul G. Rasmussen; Peter M. Emanuel; Richard G. Coalter

[57] ABSTRACT

A field transfer imager is erased after every field transfer, prior to a new field of pixels-descriptive charge packet being accumulated in the successive charge transfer stages of the charge transfer channels of the image register. The image register is operated to supply a field of "null" charge packets for each field of pixel-descriptive charge packets it supplies. The "null" charge packets and pixel-descriptive charge packets are temporarily stored in respective field storage registers, and converted a line at a time to serial format for sensing. The resulting "null" samples and pixel-descriptive samples are differentially combined to provide pixel-descriptive samples with suppressed dark current ramp components and, assuming field-rate shuttering of the imager is not used, with suppressed transfer smear components.

15 Claims, 10 Drawing Figures

SOLID STATE IMAGER WITH TRANSFER SMEAR SUPPRESSION FOR MOVING AND STATIONARY IMAGES

The present invention relates to the suppression of transfer smear in solid state imagers, both for moving and stationary portions of images.

BACKGROUND OF THE INVENTION

U.S. Pat. No. 4,010,319 issued to P. A. Levine Mar. 1, 1977, entitled "SMEAR REDUCTION IN CCD IMAGERS", and incorporated herein by reference describes the problems of transfer smear in field transfer type CCD imagers. Levine describes, as the basis for solving the transfer smear problem, the accumulation of transfer smear on a line of "null" charge packets clocked completely across the image (or A) register of the field transfer CCD imager. The resulting line of transfer-smear-descriptive charge packets is then subtractively combined with lines of charge packets descriptive of picture element (pixel) samples contaminated with transfer smear, to generate pixel samples substantially free of transfer smear. This form of transfer smear suppression works for static images or the static portions of images with some motion in them. Variants of this form of smear suppression which accommodate for the motion of isolated bright spots in the image field have been developed. See U.S. Pat. No. 4,490,744 issued Dec. 24, 1984 to P. A. Levine and entitled "SMEAR REDUCTION TECHNIQUE FOR CCD FIELD-TRANSFER IMAGER SYSTEM", for example. The problem of eliminating transfer smear in dynamic images has not heretofore been solved generally, however. The U.S. Pat. No. 4,490,744 solution does not work for two bright areas being projected into an image register charge transfer channel, for example.

U.S. Pat. No. 4,032,976 issued to P. A. Levine June 28, 1977, entitled "SMEAR REDUCTION IN CCD IMAGERS", and incorporated herein by reference describes the differences between transfer smear components originating during the most recent field transfer and during the previous field transfer, which transfer smear components contaminate pixel-descriptive charge packets stored in the field-storage (or B) register of the field transfer type of CCD imager. This patent describes how the erasure of the image register after field transfer can keep transfer smear components originating during a field transfer from contaminating the next field of image samples. This erasure does not suppress transfer smear components generated in the current field transfer, which are clocked out of the image register together with image samples. Furthermore these transfer smear components by themselves are not susceptible to suppression using a line accumulated transfer smear charge packets. Image register erasure is used as an element in the present invention, as will be described, but the invention goes further, to also solve the problem of how to suppress transfer smear components generated during the current field transfer and also to solve the problem of dark current staircase build-up during transfer.

While Levine describes an image register erasure technique applicable only to surface-channel image registers, image registers erasure techniques applicable to the buried-channel image registers now preferred are also known. They are implemented by applying adjustable voltage to gate electrodes between the image register charge transfer channels and the anti-blooming drains paralleling them. During normal operation of the image register, the voltage is adjusted to induce potential-energy barriers to charge carrier transfer from the buried channels to the drains. During erasure of the image register, the voltage is adjusted to induce surface channels between the buried channels and (anti-blooming) drains parallelling the buried channels. The clocking voltages on the gate electrodes crossing the buried channels, which gate electrodes are used to transfer charge packets forward along the buried channels, can be simultaneously made all relatively negative, to aid the transfer of all charge from the buried charge transfer channels into the drains parallelling them.

Another problem encountered in a field transfer type of imager is the accumulation of increased levels of dark current in the later lines of the field. This problem is described in U.S. Pat. No. 4,496,982 issued to P. A. Levine Jan. 29, 1985, entitled "COMPENSATION AGAINST FIELD SHADING IN VIDEO FROM FIELD TRANSFER IMAGERS" and incorporated herein by reference. See also U.S. Pat. No. 4,498,105 issued to D. D. Crawshaw Feb. 5, 1985 and entitled "FIELD-TRANSFER CCD IMAGERS WITH REFERENCE-BLACK-LEVEL GENERATION CAPABILITY". Prior-art approaches to solving the dark current ramp problem accumulate dark current at sites proximate to the field storage (or B) register, from which accumulated dark current compensating offsets for each successive line of pixel samples are derived. The problem with these approaches is that there are variations in the dark current components accompanying pixel samples along each line of pixel samples. These variations are due to localized heating effects in the B register, due to differences in the semiconductor device structure in different parts of the B register, due to defects in the semiconductor device structure within the B register, or due to combinations of these effects. These variations in dark current are not compensated against in prior art dark-current ramp suppression schemes.

SUMMARY OF THE INVENTION

The present invention is embodied in a field transfer imager having an image (or A) register erased after every field transfer, prior to a new field of pixels-descriptive charge packets being accumulated in the successive charge transfer stages of the charge transfer channels of the image register. The image register is operated to supply a field of "null" charge packets for each field of pixel-descriptive charge packets it supplies. The "null" charge packets and pixel-descriptive charge packets are temporarily stored in respective field storage registers, and converted a line at a time to serial format for sensing. The resulting "null" samples and pixel-descriptive samples are differentially combined to provide pixel-descriptive samples with suppressed dark current ramp components and, assuming field-rate shuttering of the imager is not used, with suppressed transfer smear components.

DETAILED DESCRIPTION

Figure 1:
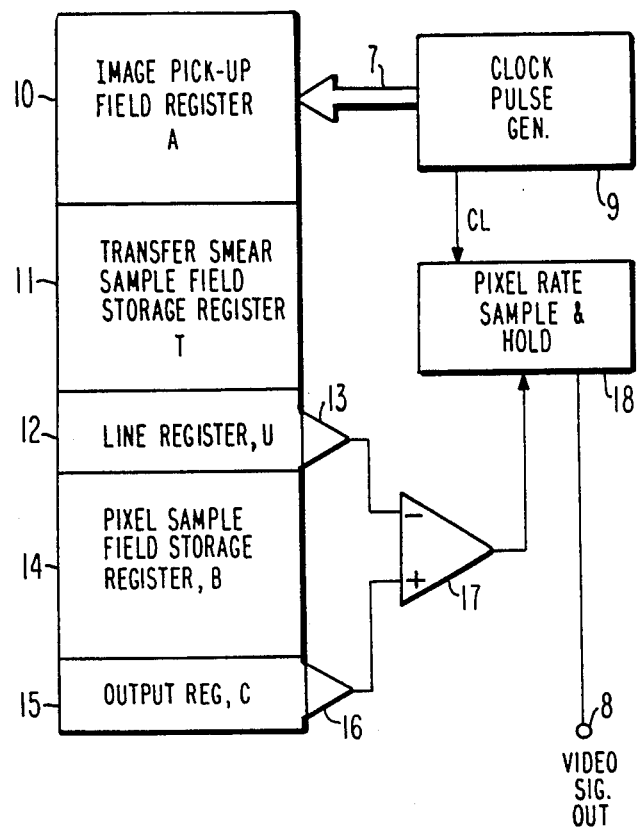
FIGS. 1, 2 and 3 are schematic diagrams of respective CCD imagers each embodying the invention.

The FIG. 1 field transfer CCD imager 100 has an image, or A, register 10 which may be clocked virtual-phase, single-phase, dual-phase, or poly-phase in response to clock pulses provided by a clock pulse generator 9 via bus 7. To simplify the drawing the connections of bus 7 to the remaining registers T, U, B and C is not shown. During each field trace interval charge packets descriptive of pixels of the radiant-energy image projected into image register 10 are accumulated in respective photoconversion sites which repose within respective ones of the successive charge transfer stages in the charge transfer channels of image register 10. These charge transfer channels (not specifically shown in FIG. 1) are arranged in parallel array with their respective output ports at the bottom of A register 10 in FIG. 1. The last row or so of charge transfer stages in A register 10 is covered by a radiation (or light) shield, which covers the other registers in FIG. 1 imager.

The output ports of the charge transfer channels in A register 10 connect to respective ones of the input ports of parallelly disposed charge transfer channels in a transfer-smear-sample field storage, or T, register 11. The charge transfer stages in the T register 11 charge transfer channels (not specifically shown in FIG. 1) are arranged in rows, the number of rows being at least as many as the number of rows of charge transfer stages in A register 10 that are exposed to the radiant energy image. The output ports of the charge transfer channels in T register 11 are arranged for parallelly loading respective ones of the successive charge transfer stages of a line, or U, register 12. Parallelly loaded U register 12 may be serially unloaded to a charge sensing stage 13 during line trace intervals in field scan.

Alternatively, U register 12 may be parallelly unloaded during field transfer to the input ports of the charge transfer channels in a pixel-sample field storage, or B, register 14 essentially corresponding to the B register in a field transfer CCD imager of conventional architecture. The charge transfer stages in the B register 14 charge transfer channels (not specifically shown in FIG. 1) are arranged in at least as many rows as the number of rows in A register 10 that are exposed to the radiant energy image. The output ports of the B register 14 charge transfer channels are arranged for parallelly loading respective ones of the successive charge transfer stages of an output line, or C, register 15. C register 15 is serially unloaded to a charge sensing stage 16 during line trace intervals in field scan.

The response of charge sensing stage 16 has the response of charge sensing stage 13 differentially combined with it in differential-input amplifier 17 in FIG. 1. Alternatively, the charge packet outputs of U register 12 and C register 15 may be supplied to a charge sensing circuit of a type known in the art that senses the differences between their respective component charge packets.

Operation of the FIG. 1 imager to suppress dark current ramp and transfer smear is as follows. During the earlier half of each field retrace interval the pixel-descriptive charge packets accumulated in respective charge transfer stages of A register 10 during the preceding field trace interval are transferred into corresponding charge transfer stages of B register 14. This is accomplished by rapidly forward clocking A register 10, T register 11, and B register 14 in synchronism with each other and operating U register 12 in a parallel-transfer-through mode between T register 11 and B register 14.

Then, still during field retrace interval, A register 10 and T register 11 are erased. Where A register 10 is provided with drains parallelling its charge transfer channels, it can be erased by transfering remnant charge into the drains. T register could be provided with drains parallelling its charge transfer channels, so it could be erased similarly, but it is simpler to defer the erasure of T and do it concurrently with the next step of operation, by a transfer-forward-and-out method.

Then, still during field retrace interval, a field of "null" charge packets is transferred from A register 10 into T register 11. This is done by rapidly forward clocking A register 10 and T register 11 in synchronism with each other. The time taken for this A-to-T register transfer is the same as taken for the A-to-T register transfer preceding. If T register 11 has not been just erased, U register 12 is rapidly forward clocked as a shift register to charge sensing stage 13 and a drain (not shown) to transfer away the previous charge contents of T register 11 ahead of its loading.

Then, A register 10 is again erased. So, at the beginning of field trace interval (or at least the "picture portion" of it), B register 14 contains lines of charge packets descriptive of pixels, and T register 11 contains lines of "null" charge packets. If the FIG. 1 imager has been unshuttered during field retrace interval, the "null" charge packets in T register 11 will be charge packets descriptive of transfer smear and the pixel-descriptive charge packets in B register 14 will have corresponding components of transfer smear.

During each successive line retrace interval just before and during field trace interval, T register 11 and B register 14 have the lines of charge packets stored therein advanced by one row of charge transfer stages. The line of charge packets transferred out of the T register 12 last row of charge transfer stages parallelly loads the successive charge transfer stages of U register 12; and the line of charge packets transferred out of the B register 14 last row of charge transfer stages parallelly loads the successive charge transfer stages of C register 15. During each line trace interval in field trace interval U register 12 and C register 16 are operated as shift registers, being forward clocked at pixel scan rate to supply charge packets to charge sensing stages 13 and 16, respectively. Differential-input amplifier 17 responds to the differential-mode pixel-descriptive components of charge sensing stage 16. The dark current ramp components generated in T register 11 and B register 14 tend to be common-mode in nature, so differential-input amplifier 17 does not respond to them at its output port.

Transfer smear components are substantially common-mode in nature and will not be responded to at the output port of differential-input amplifier 17 either. The difference in time between the generation of the transfer smear content of the pixel-descriptive charge packets and the ensuing generation of the transfer smear content of the "null" charge packet is at most about ten line times or 635 microseconds for 525 lines per 1/30 second frame time in conventional television operation. This considerably reduces motion effects in transfer smear since time differentials between corresponding transfer smear components ranges up to 16.7 milliseconds with prior art transfer smear suppression schemes, when adhering to sixty fields per second practice.

The FIG. 1 CCD imager requires two charge sensing stages 13 and 16; and matching their charge-to-voltage conversion characteristics can present a practical problem. This problem can be avoided by replacing charge sensing stages 13 and 16 with CCD structures for transferring charge to a charge packet multiplexer operative at twice pixel scan rate. The charge packet multiplexer alternately supplies charge packets from registers 13 and 16 to an electrometer that responds differentially to successive charge packets. Such an electrometer is known, for example, from U.S. Pat. No. 4,104,543 issued Aug. 1, 1978 to D. G. Maeding and entitled "MULTICHANNEL CCD SIGNAL SUBTRACTION SYSTEM". The electrometer output is applied as input signal to the pixel-rate sample-and-hold circuit 18 to provide continuous video signal output voltage at video output terminal 8.

Figure 2:
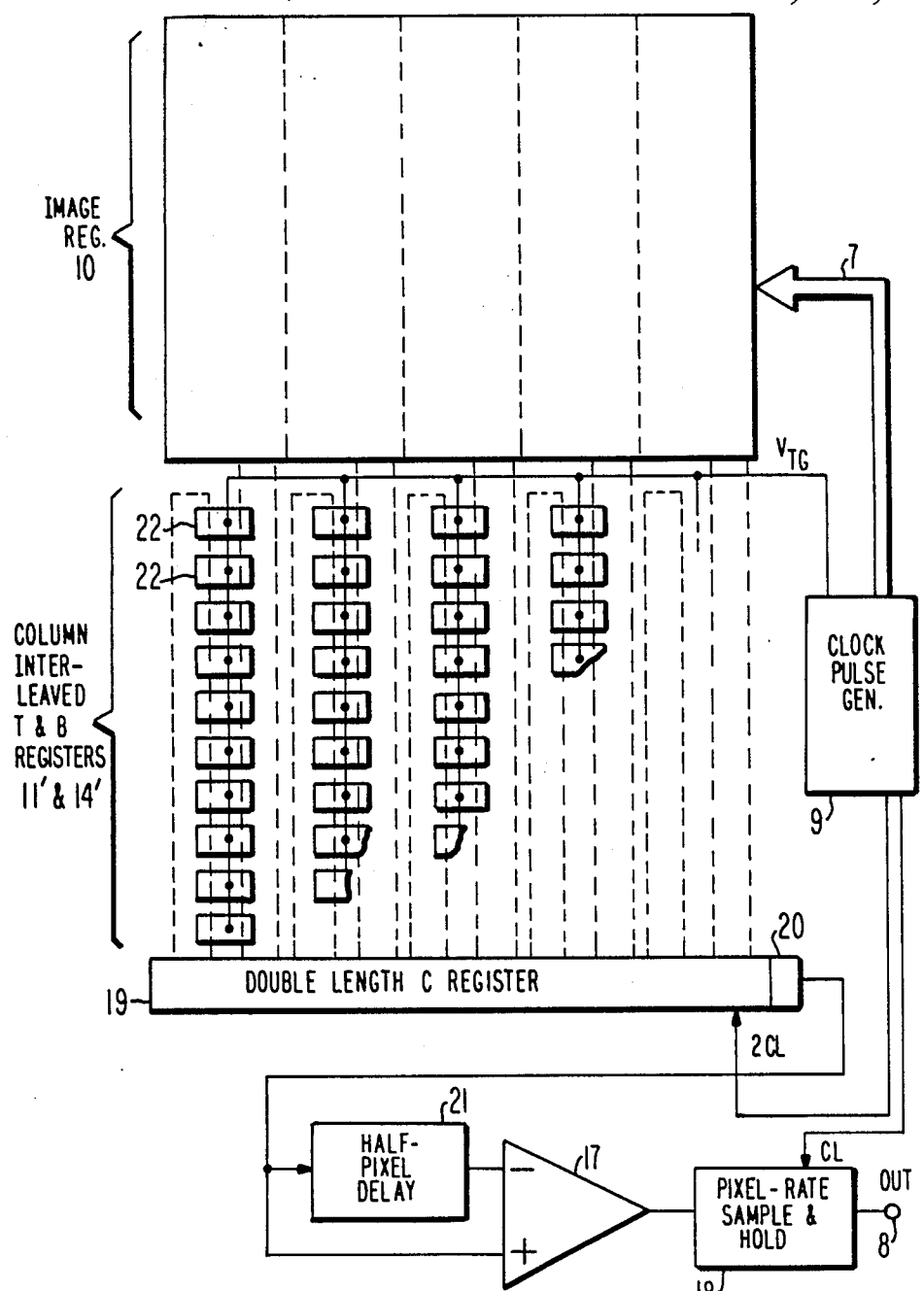

FIG. 2 shows a CCD imager of somewhat different architecture, using column interleaved T register 11' and B register 14' with their respective output ports side-loading alternate ones of the successive charge transfer stages in a double-length output, or C, register 19 during line retrace intervals in the picture portions of field scan. C register 19 is clocked at twice pixel scan rate during the ensuing line trace intervals, to supply charge packets to a single charge sensing stage 20. This avoids the problem of having to match the charge-to-voltage-conversion characteristics of two charge sensing stages. Charge sensing stage 20 may be an electrometer differentially responsive to successive charge packets, to be followed in cascade by the pixel-rate sample-and-hold circuit 18. However, FIG. 2 shows the circuitry to accommodate charge sensing stage 20 not being a differentially responsive type. Charge sensing stage 20 output voltage samples are differentially delayed by a half-pixel clocked delay circuit before being differentially combined with undelayed ones of the charge sensing stage 20 output voltage samples in differential-input amplifier 17.

An actual CCD imager will generally have many charge transfer channels in its image register, as many as a few hundred, which cannot be conveniently depicted in a drawing figure. Accordingly, FIG. 2 image register 10 is shown as having a parallel array of just five charge transfer channels separated by dashed line "channel stops" defining respective ones of its columns. The output ports of these relatively wide charge transfer channels connect to respective ones of the input ports of relatively narrow charge transfer channels in T register 11', which in practice may be done in a tapering-down charge transfer channel structure not shown in FIG. 2. The output ports of the T register 11' charge transfer channels side-load alternate ones of the successive charge transfer stages of double-length output register 19, the other of the successive charge transfer stages of register 19 being side-loaded from respective ones of the output ports of the B register 14' charge transfer channels.

Transfers of pixel-descriptive charge packets from columns of T register 11' to corresponding columns of B register 14' are carried out by parallel transfer in FIG. 2 CCD imager, rather than by serial transfer as in FIG. 1 CCD imager. When T register 11' has been loaded with pixel-descriptive charge packets, these charge packets are parallelly transferred into B register 14' by pulsing the voltage positively $V_{TG}$ applied to transfer gate electrodes between registers 11' and 14'. The transfer gate electrodes 22 can induce surface channels between corresponding charge transfer stages of T register 11' and B register 14', for example, with T register 11', B register 14' charge transfer channels differentially doped to cause charge transfer from T register 11' to B register 14' direction and to inhibit charge transfer in the opposite direction.

The halting of forward clocking in B register 14' while T register 11' continues to be forward clocked in arranged by forward clocking the registers 11' and 14' the same in all but one phase. The similar phases of clocking voltage can be applied to gate electrodes crossing the charge transfer channels of both the T register 11' and the B register 14'. The dissimilar phases of clocking voltage are applied to top-layer gate electrodes running as fingers over the lengths of the charge transfer channels of each of the registers 11' and 14'. The finger-like gate electrodes in each of the registers 11' and 14' may be joined together at opposite extremities of the charge transfer channels of the interleaved registers 11' and 14', providing for electrical continuity between the finger-like gate electrodes in each of the registers 11' and 14'. This forms a pair of interdigitated comb sturctures.

A number of variations in the charge transfer structure for parallelly loading B register 14' from T register 11' are possible. E.g., the gate electrodes 22 are shown as being separate from the normal CCD gate electrode structure (omitted as understood to keep FIG. 2 from being overcrowded) but they may instead be part of gate electrodes of one phase of the normal CCD gate electrodes, with parallel transfer being controlled by pulses superposed on normal CCD clocking voltages. Detail as to the column interleaving of T register 11' and B register 14' appear in the concurrently filed patent application Ser. No. 817,536 of Hammam Elabd, filed Jan. 9, 1986 entitled "STORAGE REGISTERS WITH COLUMN-INTERLEAVED CHARGE TRANSFER CHANNELS, AS FOR SOLID STATE IMAGERS" and assigned to RCA Corporation.

Figure 3:
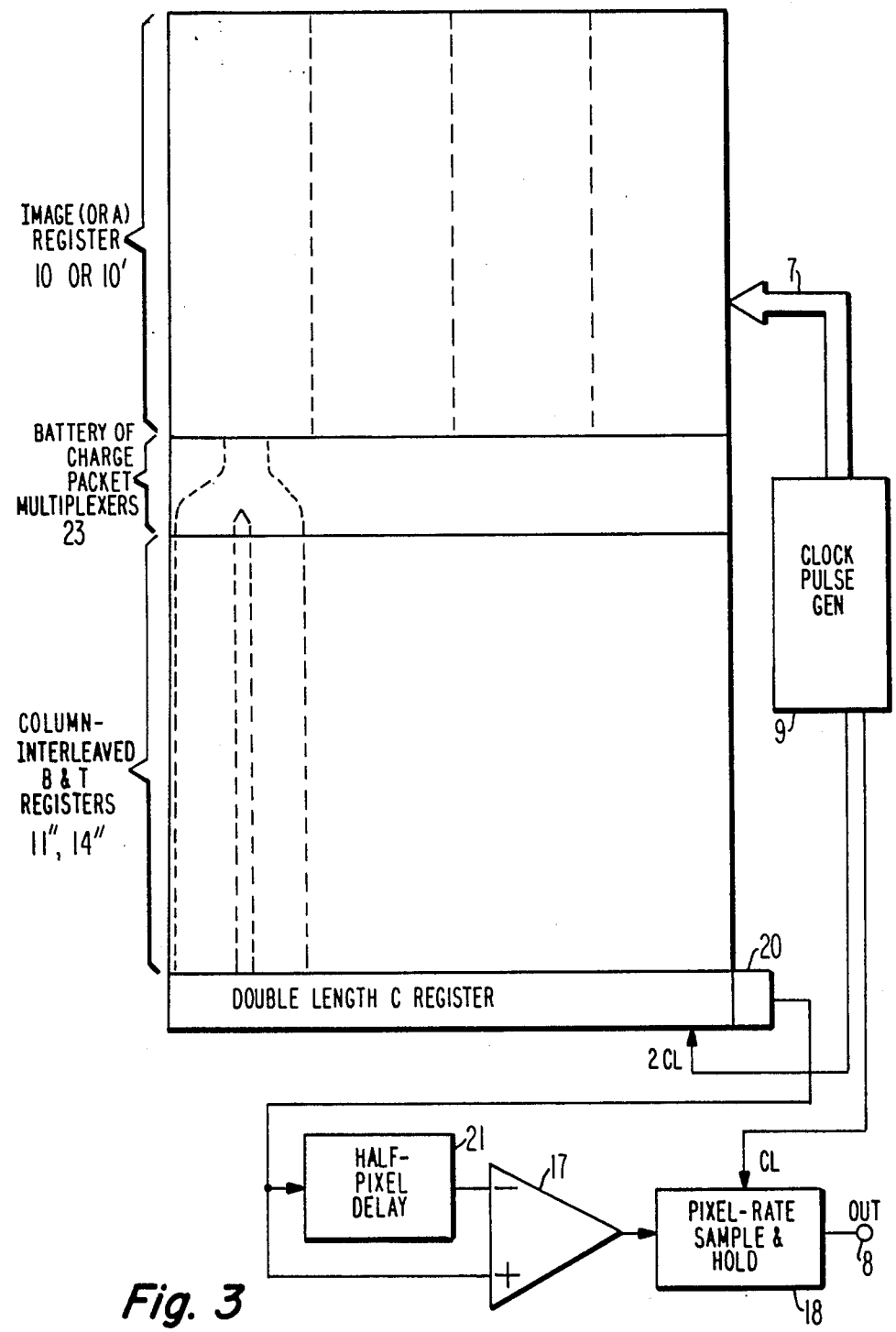

FIG. 3 shows another type of CCD imager using column interleaved T register 11" and B register 14". A battery 23 of charge packet multiplexers loads pixel-descriptive charge packets from A register 10 (or 10' to be described) into the charge transfer channels of T register 11" earlier in the field retrace interval and loads "null" charge packets from A register 10 (or 10') into the charge transfer channel of B register 14" later in the field retrace interval. The parallel transfer of charge packets from T register 11" and B register 14" to double-length output register 19 during line retrace intervals, and the serial transfer of charge packets from output register 19 to charge sensing stage 20 and so on is the same as in the FIG. 2 CCD imager.

In the embodiments of the invention now to be described, the time differentials between the generation of transfer smear accompanying pixel-descriptive charge packets and the transfer smear accompanying "null" charge packets are to be substantially eliminated. This is done using an image register 10' the successive gate electrodes of which are segregated into an even number of clock phases, four or more. Image integration is carried out on a half-pixel basis with the dimension of a single pixel being two charge transfer stages in the direction along which the image register charge transfer channels run. After image integration and before field transfer, the charge packets descriptive of the trailing half pixels are clocked forward one charge transfer stage, while the charge packets descriptive of the leading half pixels are held in the charge transfer stages in which they were integrated. This merges the charge packets to form charge packets descriptive of full pixels, rows of which charge packets are interleaved on a row-by-row basis with rows of null charge packets. Field transfer is then carried forward, transferring the rows of pixel-descriptive charge packets and of null packets a row at a time out of the image register 10'. The transfer smear in a line of pixel-descriptive charge packets is offset from the transfer smear in an adjacent line of "null" charge packets, by the length of a charge transfer stage spatially, and by one line time at field transfer clock rate temporally, so the transfer smears in these adjacent lines of charge packets are almost entirely in common-mode relationship to each other. The image register is erased after every field transfer to eliminate in each field transfer the effects of transfer smear arising from the previous field transfer.

Figure 4:
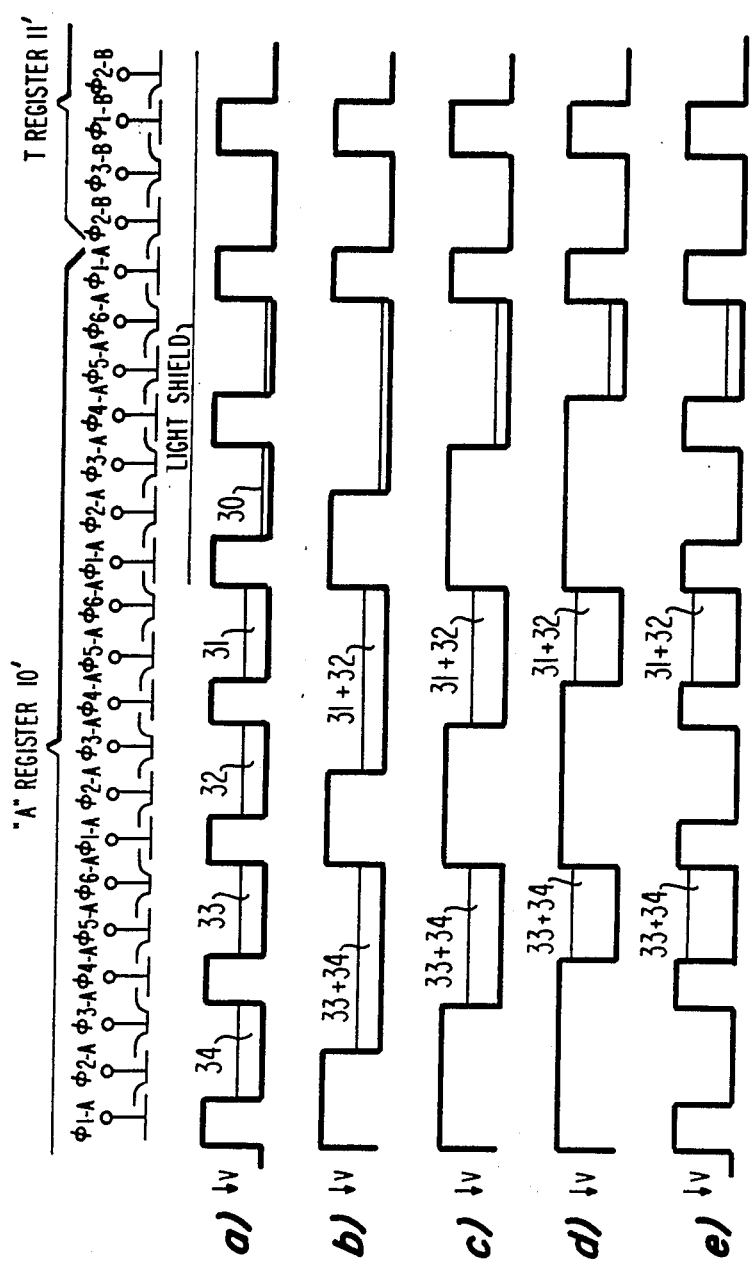
FIGS. 4 and 5 are diagrams of the potential energy profiles of a six-phase image register used to generate spatially interleaved rows of pixel-descriptive and "null" charge packets in certain CCD imagers embodying the invention.
Figure 5:
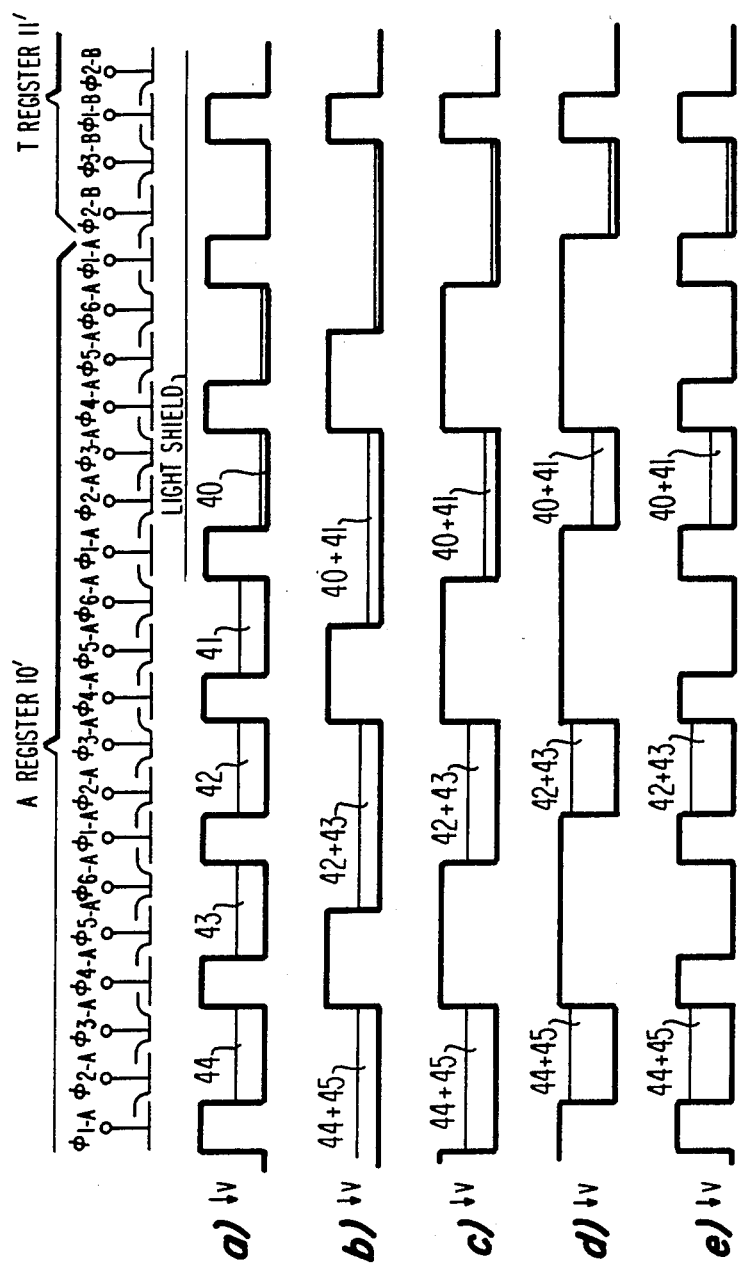
Figure 6:
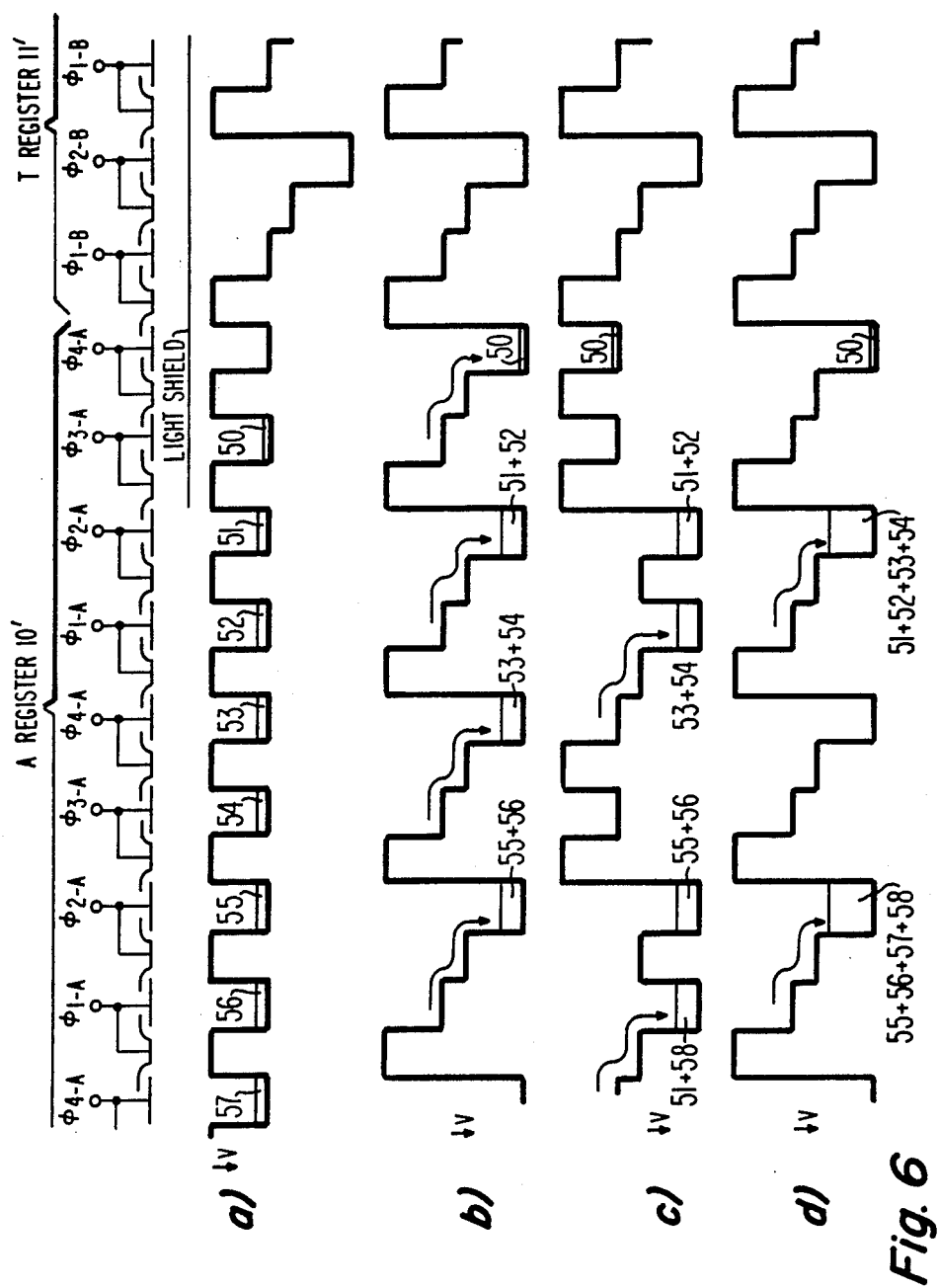
FIGS. 6 and 7 are diagrams if the potential energy profiles of a four-phase image register used to generate spatially interleaved rows of pixel-descriptive and "null" charge packets in certain CCD imagers embodying the invention.
Figure 7:
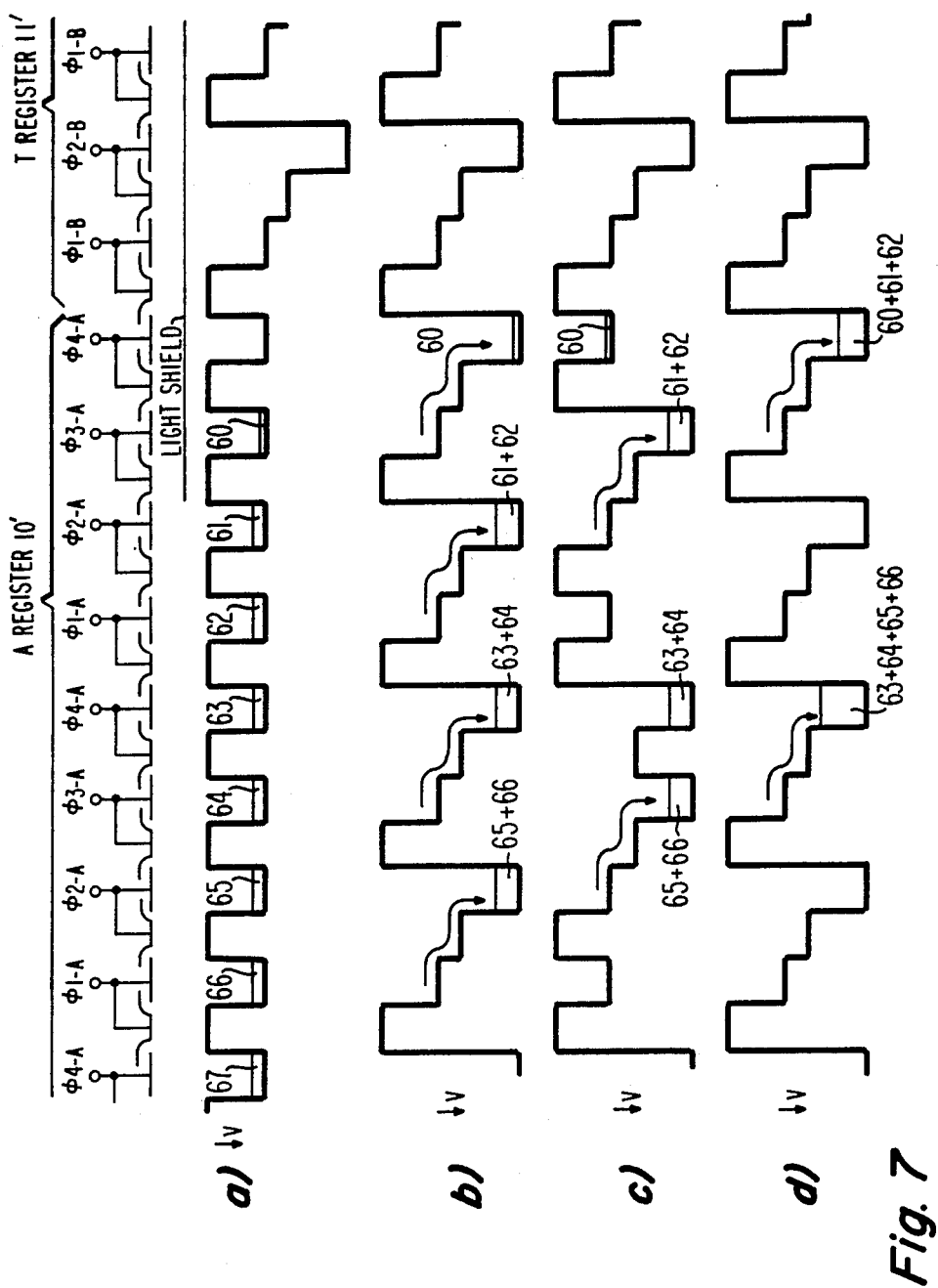

The FIG. 3 CCD imager can have an image (or A) register 10' as just described, for example. FIGS. 4 and 5 will be used to describe in more detail the operation of a six-phase image register 10'; FIGS. 6 and 7 will be used to describe in more detail the operation of a four-phase image register 10'. Then, alternative CCD imager architectures using an image register 10' will be described, with reference to FIGS. 8 and 9.

FIGS. 4 and 5 show the step for inserting "null" charge packets in a six-phase A register 10' during odd-numbered fields and during even-numbered fields, respectively, supposing field-to-field line interlace is to be used. FIGS. 4 and 5 are each headed by the gate electrode structure at the interface of A register 10' and T register 11', with the position of the light shields overlapping the last row of A register 10' being shown. In the successive-in-time potential profiles (a), (b), (c), (d) and (e) of each of FIGS. 4 and 5 positive electrostatic potential is downwardly directed. Charge transfer from A register 10' to T register 11' will be from left to right in FIGS. 4 and 5, of course. The T register 11' potential profiles (a), (b), (c), (d) in each of FIGS. 4 and 5, during the beginning of field retrace interval before the time A register 10' and T register 11' are three-phase clocked in synchronism with each other, are unimportant. Potential energy barriers are induced under gate electrodes respectively of $\phi_{1-A}$ and $\phi_{4-A}$ clocking phase during image integration; and potential energy wells for collecting photocharge are induced under adjacent pairs of $\phi_{2-A}$, $\phi_{3-A}$ gate electrodes and under adjacent pairs of $\phi_{5-A}$, $\phi_{6-A}$ gate electrodes. Profile (a) in both FIGS. 4 and 5 shows the condition of A register 10' after image integration is completed, which is the earliest part of the field retrace interval, normally. It is normal practice to increase the voltage applied to well-inducing gate electrodes at this type, to deepen the potential energy wells containing charge during the field hager process to follow. (The potential-energy wells are kept shallow during image integration to reduce dark current accumulation and thus dark current noise). Profiles (a) in both FIGS. 4 and 5 presume this well-deepening procedure to have just taken place. A succession of half-pixel charge packets 31–35 etc. have been collected in a representative charge transfer channel in FIG. 4; and in FIG. 5 a succession of half-pixel charge packets 40–45 etc. have been collected.

At the outset of field retrace in an odd field, per FIG. 4, potential profile (b), $\phi_{4-A}$ clock phase goes positive, and $\phi_{2-A}$ clock phase is more gradually made negative. This merges each odd-numbered one of the integrated charge packets 30–34 etc. with the next-higher, even-numbered one of these charge packets.

The well deepening proceduce mentioned in the preceding paragraph has deepened the potential-energy wells sufficiently that the merged charge packets do not overflow into the anti-blooming drains if their component charge packets did not. $\phi_{3-A}$ clock phase is then made negative, resulting in FIG. 4(c) potential profile. $\phi_{4-A}$ clock phase is subsequentially made negative, resulting in FIG. 4(d) potential profile. The pixel-descriptive merged charge packets 31+32, 33+34, etc. are contained in potential energy wells each under a respective pair of adjacent $\phi_{5-A}$, $\phi_{6-A}$ gate electrodes. Each well is bounded by potential barriers induced under a leading $\phi_{1-A}$ gate electrode and under a trailing $\phi_{4-A}$ gate electrode. In FIG. 4 potential profile (e), "null" charge packets have been interleaved with the pixel-descriptive charge packets 31+32, 33+34, etc. by returning $\phi_{2-A}$ and $\phi_{3-A}$ positive. Transfer from A register 10' to T register 11' is now carried out by applying high-rate $\phi_1$ clock phase to $\phi_{1-A}$, $\phi_{4-A}$ and $\phi_{1-B}$ gate electrodes; by applying high-rate 2 $100_6$ clock phase to $\phi_{2-A}$, $\phi_{5-A}$ and $\phi_{2-B}$ gate electrodes; and by applying high rate $\phi_3$ clock phase to $\phi_{3-A}$, $\phi_{6-A}$ and $\phi_{3-B}$ gate electrodes. The $\phi_1$, $\phi_2$ and $\phi_3$ clock phases are successively later in time and repeat cyclically. That is, to say charge packet transfer from A register 10' to T register 11' is carried out by high-rate three-phase clocking similar to that in the normal A-register-to-B register transfer in conventional field transfer imagers although, of course, the transfer has to be made in half as long a time as permitted in that prior art transfer procedure, to allow time for a later B-to-T register transfer. Subsequent to the A-to-T register transfer, A register 10' is erased to remove remnant transfer smear charge packets.

At the outset of field retrace in an even field, per FIG. 5 potential profile (b), on the other hand, $\phi_{1-A}$ clock phase goes positive; and $\phi_{5-A}$ clock phase is more gradually made negative. This merges each even-numbered one of the charge packets 40–44 etc. with the next-higher, odd-numbered one of these charge packets. $\phi_{6-A}$ clock phase is then gradually made negative, resulting in FIG. 5(c) potential. $\phi_{1-A}$ clock phase is subsequently made negative, resulting in FIG. 5(d) profile. The pixel-descriptive merged charge packets 40+41 (subsequently discarded), 42+43, 44+45, etc. are contained in potential energy wells each under a respective pair of adjacent $\phi_{2-A}$, $\phi_{3-A}$ gate electrodes. Each well is bounded by potential barriers induced under a leading $\phi_{4-A}$ gate electrode and under a trailing $\phi_{1-A}$ gate electrode. In FIG. 5 potential profile (e), "null" charge packets have been interleaved with the pixel-descriptive charge packets 42+43, 44+45, etc. by returning $\phi_{5-A}$ and $\phi_{6-A}$ positive. Note the line interlace relationship of these charge packets with charge packets 31+32, 33+34, etc. of the preceding odd field as depicted in FIG. 4 potential profile (e). Transfer from A register 10' to T register 11' is carried out, proceeding from FIG. 5 potential profile (e), again by applying high-rate $\phi_1$ clock phase to $\phi_{1-A}$, $\phi_{4-A}$ and $\phi_{1-B}$ gate electrodes; by applying high-rate $\phi_2$ clock phase to $\phi_{2-A}$, $\phi_{5-A}$ and $\phi_{2-B}$ gate electrodes; and by applying high rate $\phi_3$ clock phase to $\phi_{3-A}$, $\phi_{6-A}$ and $\phi_{3-B}$ gate electrodes.

FIGS. 6 and 7 show the steps for inserting "null" charge packets in a four-phase A register 10' during odd-numbered fields and during even-numbered fields, respectively, supposing field-to-field line interlace is to be used. Each clocking voltage phase is shown applied to two-successive-gate-electrodes structures, the leading gate electrode in a first polysilicon layer and the trailing gate electrode in a second polysilicon layer to introduce an in-channel electrostatic potential step between them which step will cause charge transfer to be from left to right during two-phase forward clocking. As known in the prior art, each clocking voltage phase could instead by applied to single-gate-electrode structures, with the semiconductor substrate under the leading and trailing edges of each gate electrode being differentially doped to cause the induction of the electrostatic potential step necessary to provide for forward charge transfer alone responsive to two-phase clocking signals.

Profile (a) in both FIGS. 6 and 7 shows the condition of A register 10' at the conclusion of image integration, just before field retrace interval. A succession of quarter-pixel charge packets 50–57 etc. have been collected in a representative charge transfer channel in FIG. 4; and in FIG. 5 a succession of quarter-pixel charge packets 60–67 etc. have been collected. Potential barriers are induced under the second-polysilicon-layer gate electrodes; potential wells are induced under the first-polysilicon-layer gate electrodes. At the outset of field retrace in each field, the even clock phases in A register 10' are made relatively positive respective to the odd clock phases, to collect half-pixel descriptive charges as shown in the potential profiles (b) of FIGS. 6 ad 7. (Indeed, one can alternatively arrange for image integration to take place with such in-channel potential energy profiles.)

FIG. 6 potential (c) results from $\phi_{4-A}$ being clocked negative and $\phi_{1-A}$ being clocked positive in field retrace intervals between odd-field integration in A register 10' and odd-field read-out from A register 10'. Then, when FIG. 6 potential profile (d) is established by clocking $\phi_{1-A}$ negative, pixel-descriptive charge packets 51+52+53+54, 55+56+57+58 etc. are formed in a first spatial phasing. On the other hand, FIG. 7 potential profile (c) results from $\phi_{2-A}$ being clocked positive and $\phi_{3-A}$ being clocked negative in field retrace intervals between even-field integration in A register 10' and even-field read-out from A register 10'. Then, when FIG. 7 potential profile (d) is established by clocking $\phi_{3-A}$ positive, pixel-descriptive charge packets 63+64+65+66, 67+68+69+70 (not shown) etc. are formed in a second spatial phasing, interleaved with the first spatial phasing.

After the potential profile (d) of FIG. 6 or 7 is established in the early portion of field retrace interval, field transfer from A register 10' to T register 11' takes place within field retrace interval. This is done by applying high rate $\phi_1$ clocking voltage to $\phi_{1-A}$, $\phi_{3-A}$ and $\phi_{1-B}$ gate electrodes and by applying high-rate $\phi_2$ clocking voltage to $\phi_{2-A}$, $\phi_{4-A}$ and $\phi_{2-B}$ gate electrodes. Subsequently, A register 10' is erased to remove remnant transfer smear charge packets.

Figure 8:
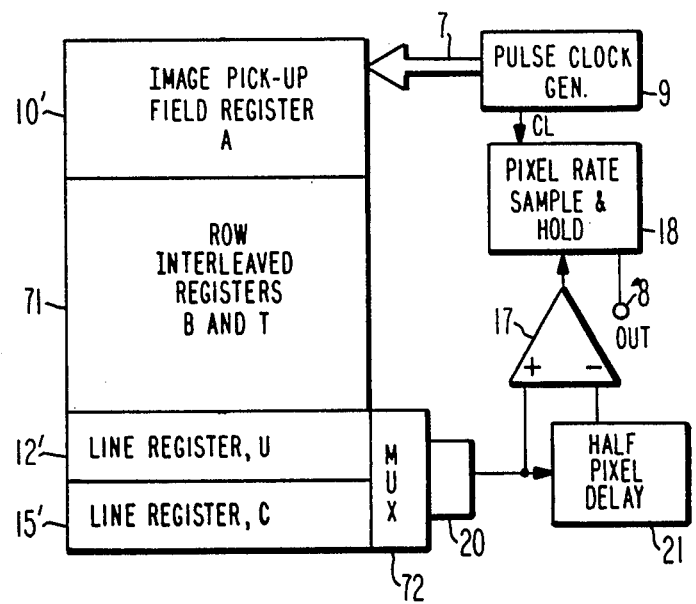
FIGS. 8 and 9 are schematic diagrams of respective CCD imagers each embodying the invention.

FIG. 8 CCD imager uses an image register 10' of a type that parallelly loads lines of charge packets, alternate lines of which are pixel-descriptive charge packets and alternate lines of which are "null" charge packets, into a CCD area-array register 17 comprising row-interleaved B and T registers. This loading is done during field retrace interval, and A register 10' is erased thereafter to remove remnant transfer smear. During each line retrace interval in picture scan interval, register 17 advances its charge packet contents two rows. The displaced line of picture-descriptive charge packets transfers through the charge transfer stages of line (or U) register 12' to parallelly load the charge transfer stages of output line (or C) register 15. The displaced line of "null" packets with accumulated dark current ramp (and transfer smear, if A register 10' be unshuttered) parallelly loads the charge transfer stages of U register 12'.

During each line trace interval in picture scan interval U and C registers 12' and 15' are operated as shift registers, being forward clocked at pixel scan rate. A charge packet multiplexer 72 interleaves their serial outputs at twice pixel scan rate, with half-pixel offset between them, for application to charge sensing stage 20. Alternatively, a differentially responsive electrometer could be used, with multiplexer 72, half-pixel delay 21 and differential-input amplifier 17 being dispensed with.

One skilled in the art and acquainted with this disclosure will appreciate that a variant of FIG. 8 where the order of the U and C registers is reversed is possible if image register 10' is made to provide an initial null sample every field. Multiplexer 72 is altered to suit.

Figure 9:
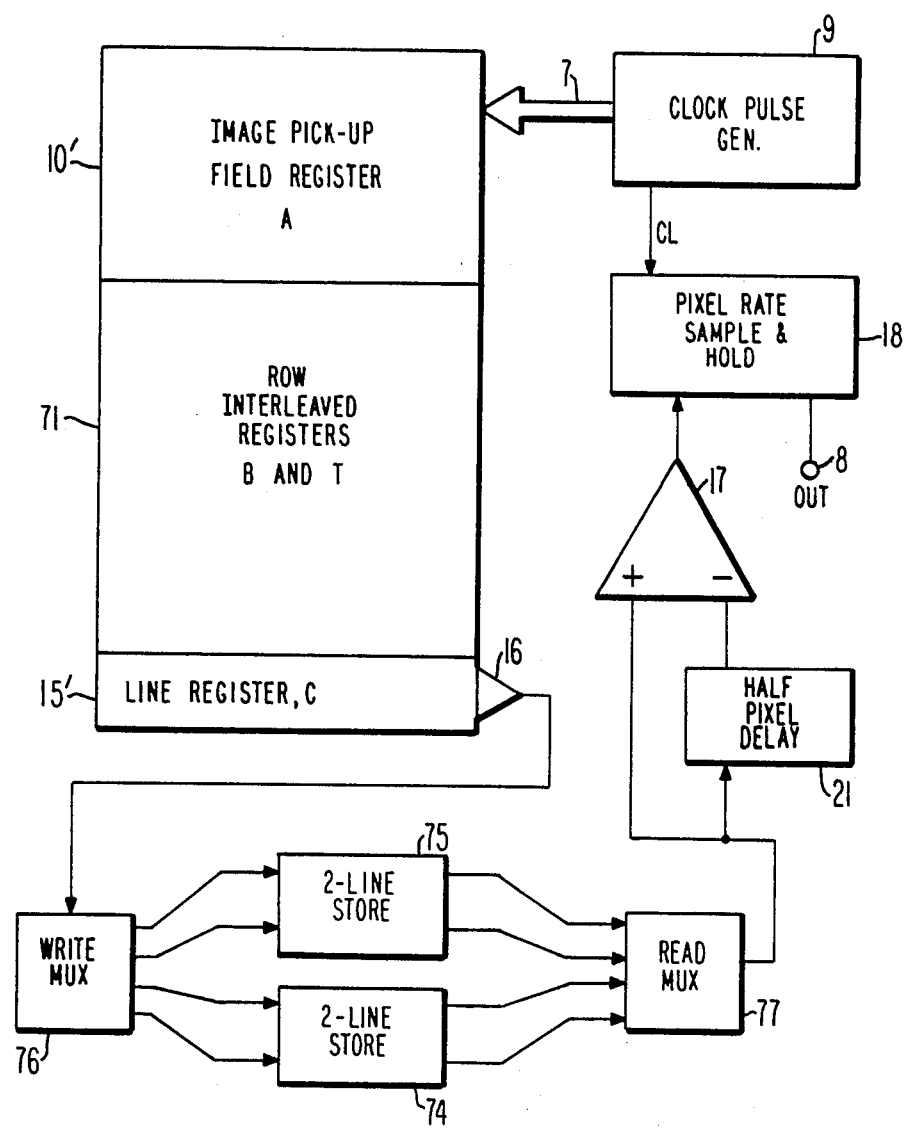

FIG. 9 CCD imager differs from that of FIG. 8 in that register 71 is clocked out at twice line scan rate during picture scan interval to parallelly load the successive charge transfer stages of output (or C) register 15', line (or U) register 12' being dispensed with. Scan converter 73 converts the sample format supplied from charge sensing stage 16 responsive to charge packets serially transferred from C register 15' to the same sample format supplied in FIG. 8 from charge sensing stage 70. To this end, scan converter includes two-line stores 74, 75; write multiplexer 76; and read multiplexer 77. (A two-line store may be constructed from a random-access memory and a clocked-counter address penerator). Each scan line during picture scan, write multiplexer 76 causes one of the two lines of two-line store 74 to be written at twice pixel-scan rate with pixel-descriptive pixels, while read multiplexer 77 causes the other of the two lines of store 74 to read out at pixel-scan rate the line of pixel-descriptive samples stored the previous line trace interval. Each scan line during picture scan, write multiplexer 76 also causes one of the two lines of two-line store 75 to be written at twice pixel-scan rate, while read multiplexer causes the other of the two lines of store 75 to read out at pixel scan rate a line of nulls temporally interleaved with pixel-descriptive samples. Scan conversion is often simpler to carry forward in the digital sampling regime, rather than the analog sampling regime, in which case scan converter 73 will include an analog-to-digital converter at its input and a digital-to-analog converter at its output.

Figure 10:
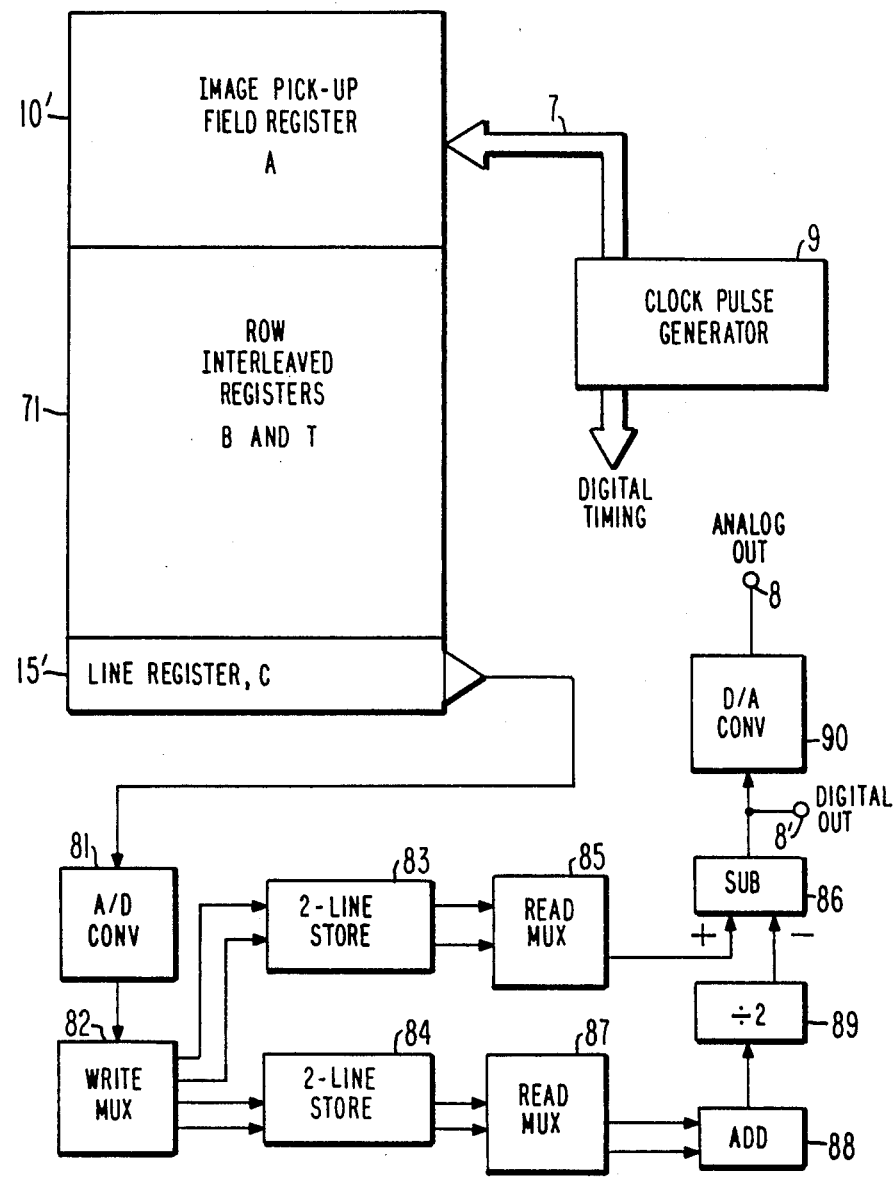
FIG. 10 is a modification to be made to the FIG. 9 imager, resulting in an improved embodiment of the invention.

FIG. 10 shows how the FIG. 9 CCD imager may be used with spatial filtering that aligns the transfer smear samples more accurately with the pixel descriptive samples contaminated by transfer smear, to provide for suppressing transfer smear. It is presumed the imager read-out has an image register 10' allowing the null charge packets at the beginning of each line interval. Analog samples from charge sensing stage 16 are digitized in analog-to-digital converter 81, then supplied to a write multiplexer 82 for two-line stores 83 and 84.

Write multiplexer 81 causes each line of pixel-descriptive samples to be written at twice pixel-scan rate into one of the two lines of storage available in two-line store 83 on a cyclic basis each line interval during picture scan. Write multiplexer 82 also causes each line of "null" samples to be written at twice pixel-scan rate into one of the two lines of storage available in a two-line store 84 on a cyclic basis each line interval during picture scan. Each line interval during pixel scan, a read multiplexer 85 for two-line store 83 causes the line of pixel-descriptive samples stored during the previous line to be read out of two-line store 83 at pixel-scan rate to the minuend input of a subtractor 86. Another read multiplexer 87, for two-line store 84, causes the current line of "null" samples stored the previous lines to be read out of two-line store 84 in paired samples supplied at pixel-scan rate to the input of an adder 88. The output response of adder 88 is supplied to a divide-by-two circuit 89 (usually a simple circuit connection with the least significant bit being discarded). The halved output response of adder 88 is supplied to the subtrahend input of subtractor 86.

Each line of pixel descriptive samples contaminated by dark-current ramp and possibly transfer smear, then, has subtracted from it in subtractor 86 the average of the proceeding and succeeding lines of "null"samples. Subtractor 86 supplies a digitized video output signal with suppressed dark-current ramp and transfer smear, if any to an output 8' and to the digital-to-analog converter 90 which provides an analog output signal at terminal 8.

D. J. Sauer in U.S. Pat. No. 4,178,614 issued Dec. 11, 1979 and entitled "READOUT OF A DENSELY PACKED CCD" describes an alternative method of transferring lines of charge packets during field transfer in a field transfer CCD imager Sauer calls this method "electrode-per-bit clocking". This method is used in CCD imagers manufactured by N. V. Phillips Gloeilampenifabriken, Eindhoven, Netherlands, who call CCD imagers using the method "accordion" imagers. See "The Accordion Imager: More Than Just a CCD-Sensor", A. J. P. Theuwissen, C. H. L. Weijtens, J. N. G. Cox, pages 87–90 of Advanced Printing of Paper Summaries ELECTRONIC IMAGING 85, organized by the Institute for Graphic Communication and sponsored by the Society of Photographic Scientists and by *Engineers and Digital Design* magazine.

The present invention is well adapted for use with accordion imagers. Where field-to-field line interlace is employed in an accordion imager, the technique of clocking alternate lines of charge packets sampling image forward one row, to merge with respective succeeding lines of charge packets sampling image, can be used to create a field of charge packets sampling image interleaved on a line-by-line basis with a field of null charge packets. Field transfer then goes forward using electrode-per bit clocking, with the field storage register having enough rows of charge packet storage to accommodate all the lines of image-sample-plus-transfer-smear charge packets and all the intervening lines of transfer-smear-only charge packets. The spatial phasing of clocking alternate lines of charge packets sampling image forward one row, to merge with respective succeeding lines of charge packets sampling image, is staggered from field-to-field.

Where field-to-field interlace is not employed, one may arrange for similar operation except for not changing the spatial phasing of this adjacent-row merging process from field to field. However, another mode of operation for introducing lines of null charge packets is made possible by the accordion process. When the accordion image register is being opened, it is opened two rows for every line of charge packets clocked forward from the closed portion of the image register, rather than being opened one row for every line of charge packets clocked forward from the closed portion of the image register. This overclocking of the open portion of the accordion image register causes "phantom" lines of null charge packets to be interleaved with the lines of image-sampling charge packets, in accordance with P. A. Levine's teaching in U.S. Pat. No. 4,567,524 issued Jan. 28, 1986 and entitled "SMEAR REDUCTION IN CCD IMAGERS USING EMPTY WELL CLOCKING".

Variants of these accordion imagers in which the "accordion is opened" in the image register, but is not "closed" in the field storage register, and which incorporate the present invention are also possible. Such imagers can be viewed as variants of the FIG. 8 imager, the difference being in the way lines of null charge packets are interleaved with lines of image-responsive charge packets.

The present invention may also be used in CCD imagers which transfer field of charge packets from the image register in the direction of line scan to a field storage register, rather than in the direction of line advance, as in the CCD imagers previously described.

What is claimed is:

1. A method for operating a field transfer imager, comprising:
    erasing an image field register;
    accumulating one field of image-representative charge in said image field register during a non-blanking interval of a field period;
    placing one field of null charge in said image field register during a field blanking interval of said field period;
    transferring said field of image representative charge and said field of null charge to a two-field storage register, using time-division multiplexing, during said field blanking interval;
    recovering said one field of image-representative charge and said one field of null charge of stored charge during a subsequent field period; and
    combining said recovered two fields of stored charge during said subsequent field period to provide a video output signal.

2. A method as set forth in claim 1 including the further step of:
    operating said field transfer imager unshuttered.

3. An imager, comprising:
    a cascade connection of five registers comprising a image field register, a first field storage register, a first line storage register, a second field storage register and a second line storage register;
    clock pulse generator means coupled to said registers for transferring image representative charge from said image register to said first field storage register during a first time interval, for erasing said image register during a second time interval, for concurrently transferring said image charge to said second field register and transferring a field of smear representative charge from said image register to said first field storage register during a third time interval, for erasing said image register during a fourth time interval; and means coupled to said first and second line registers for forming a video output signal during a fifth time interval having reduced transfer smear and reduced dark current build-up.

4. An imager, comprising:

a cascade connection of three registers comprising an image pick-up register, a two-field storage register and a two-line output register;

clock pulse generator means coupled to said registers for transferring image representative charge from said image register to said two-field storage register during a first time interval, for erasing said image register during a second time interval, for transferring a transfer smear representative charge from said image register to said two-field storage register during a third time interval and for erasing said image register during a fourth time interval; and means coupled to said two-line output register for forming a video output signal during a fifth time interval having reduced transfer smear and dark current build-up.

5. An imager as recited in claim 4 wherein said image register has a given number of charge pick-up columns and wherein said two-field storage register has twice as many storage columns and transfer gate means for providing column-to-column transfers of charge.

6. An imager as recited in claim 4 wherein said image register has a given number of charge pick-up columns and said two-field storage register comprises twice as many storage columns coupled to the columns of said image register via charge packet multiplexing means.

7. An imager as recited in claim 4 wherein said image field register includes a first and second pluralities of interleaved charge storage locations and charge transfer electrode means for transferring charge stored in said first plurality of locations to said second plurality of locations.

8. An imager, comprising:

a cascade connection of registers, comprising an image pick-up register, a two-field storage register and an output register;

clock pulse generator means coupled to said registers for transferring first and second fields of interleaved image representative charge and transfer smear representative charge to said two-field storage register during a first time interval and for erasing said image register during a second time interval; and means coupled to said output register for forming a video output signal having reduced transfer smear and dark current build-up.

9. An imager as recited in claim 8 wherein said two-field storage register comprises a pair of field storage registers having serially connected respective charge transfer channels.

10. An imager as recited in claim 8 wherein said image field register includes first and second pluralities of interleaved transfer channels and charge transfer electrode means for transferring charge stored in said first plurality of transfer channels to said second plurality of transfer channels.

11. An imager as recited in claim 8 wherein said means coupled to said output register includes spatial filter means for averaging lines of transfer smear representative signal and for combining the averaged lines with non-averaged line of image representative signal to form said video output signal.

12. An imager, comprising:

an image pick-up field register;

first means for erasing said image pick-up field register;

second means for causing one field of image representative charge to be accumulated in said image field register during a non-blanking interval;

third means for placing one field of null charge in said image register during a blanking interval;

fourth means for transferring said field of image representatives charge and said field of null charge to a two-field storage register during said blanking interval;

fifth means for recovering said one field of image representative charge and said one field of null charge of stored charge during a subsequent field period, and output means for combining said recovered two fields of stored charge during said subsequent field period to provide a video output signal.

13. An imager as recited in claim 12 wherein said image register is un-shuttered.

14. In a field transfer imager having an image register and a field storage register, a method for suppressing smear including the steps of:

arranging interleaved rows of image-descriptive charge packets and null charge packets in said image register at times before field transfer;

during field transfer intervals contained within field retrace intervals, serially transferring said rows of charge packets out of said image register into the field storage register;

erasing remnant charge from said image register after each field transfer and before beginning to integrate the next field of image-descriptive charge packets, during field trace intervals, successively extracting rows of image-descriptive charge packets from said field storage register and converting the charge packets in each extracted row to serially supplied signal plus transfer smear samples;

during field trace intervals, successively extracting rows of null charge packets from said field storage register, and converting the charge packets in each extracted row to serially supplied transfer smear only samples;

arranging the extraction of rows of image descriptive charge packets and rows of null charge packets so that transfer smear only samples similar to the transfer smear components of signal plus transfer smear samples are simultaneously serially supplied with those said signal plus transfer smear samples; and combining said simultaneously supplied transfer smear only samples with said signals plus transfer smear samples to result in signal samples with substantially lessened accompany transfer smear.

15. In a solid state imager having an image register with multiple lines of photocharge accumulating sites therein, which sites accumulate photocharge responsive to a radiant energy image impinging on said image register, to generate charge packets descriptive of respective elements of that impinging image during image integration intervals separated from each other by intervening intervals in time, and having means for transferring fields of charge packets from said image register during said intervening intervals in time, which means transfers a field of charge packets descriptive of respective elements of impinging image from said image register during each of said intervening intervals in time—an improvement for suppressing transfer smear components contaminating each said field of charge packets descriptive of respective elements of impinging image after transfer from said image register, which improvement comprises:

means for generating a field of null charge packets in said image register during each of said intervening intervals in time;

means for generating a field of charge packets descriptive of transfer smear by transferring said field of null charge packets from said image register, during the one of said intervening intervals in time it is generated, transferring being made by said means for transferring fields of charge packets from said image register and being made on a time-division multiplex basis with the field of charge packets descriptive of respective elements of impinging image;

means for erasing said image register following the transfers, during the same intervening interval in time, of both a field of charge packets descriptive of respective elements of impinging image and a field of null charge packets, said erasing removing remnant transfer smear charge from said image register, so it is not present through the ensuing image integration interval; and means for ascertaining the non-correlation of the transferred field of charge packets descriptive of respective elements of impinging image and the transferred field of null charge packets transferred during the same intervening interval in time, thereby generating a description of said impinging image with suppressed transfer smear.

* * * * *